United States Patent [19]
Collins et al.

[11] 3,896,955
[45] July 29, 1975

[54] AUTOMATED MULTI-LEVEL VEHICLE PARKING SYSTEM

[75] Inventors: Earl R. Collins, La Canada; Marshall E. Alper, Pasadena, both of Calif.

[73] Assignee: California Institute of Technology, Pasadena, Calif.

[22] Filed: Oct. 3, 1974

[21] Appl. No.: 403,154

[52] U.S. Cl. .......................................... 214/16.1 CB
[51] Int. Cl. .............................................. E04h 6/06
[58] Field of Search .................. 214/16.1 CB, 16.1 R

[56] References Cited
UNITED STATES PATENTS

| | | | |
|---|---|---|---|
| 2,752,051 | 6/1956 | Strahm et al. | 214/16.1 CB |
| 2,890,802 | 6/1959 | Alimanestiano | 214/16.1 CB |
| 2,923,421 | 2/1960 | De Roumefort | 214/16.1 CB |
| 3,161,303 | 12/1964 | Burrows | 214/16.1 CB |
| 3,232,454 | 2/1966 | Coursey | 214/16.1 CB |
| 3,301,413 | 1/1967 | Coursey | 214/16.1 CB |

FOREIGN PATENTS OR APPLICATIONS

| | | | |
|---|---|---|---|
| 1,107,720 | 8/1955 | France | 214/16.1 CB |
| 337,726 | 10/1930 | United Kingdom | 214/16.1 CB |
| 887,823 | 1/1962 | United Kingdom | 214/16.1 CB |
| 1,043,371 | 9/1966 | United Kingdom | 214/16.1 CB |

*Primary Examiner*—Robert J. Spar
*Assistant Examiner*—R. B. Johnson
*Attorney, Agent, or Firm*—Lindenberg, Freilich, Wasserman, Rosen & Fernandez

[57] ABSTRACT

A multi-level garage in which vehicles are parked in parking stalls on any of a plurality of parking levels by means of elevator-supported transfer carts. Each parking stall consists of four multifinger spaced apart combs, with the fingers at the stalls at each level being in a common horizontal plane. Each transfer cart includes a top transfer plate with four spaced apart multifinger combs, the fingers of each comb being adapted to support a wheel of a vehicle positioned on the transfer plate. The latter is vertically movable with respect to the cart between a raised first position and a lowered second position.

The stalls' fingers and the fingers of the transfer plate are arranged so that when the cart is moved from the elevator to any stall, the transfer plate is movable vertically between the two positions with the transfer plate fingers and the stalls' fingers freely intermeshing. When the cart is at any stall, the transfer plate is above and below the plane of all the stalls' fingers when being in the first and second positions respectively.

5 Claims, 11 Drawing Figures

AUTOMATED MULTI-LEVEL VEHICLE PARKING SYSTEM

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates generally to a storage system and, more particularly, to a new and improved storage system finding particular application for the parking of automobiles.

2. Description of the Prior Art

The motor vehicle age created a problem of gigantic proportions involving off-street parking or storage of automobiles or cars in the crowded and traffic congested inner city core areas, or wherever land prices are at a premium. In attempting to solve this problem, multi-level car parking systems or garages have been designed. The ramp type garage is the most typically and widely used. In it, a driver drives the car along the multi-level ramp until a vacant parking slot is found. Among the major disadvantages of such a garage is the large storage volume needed per car. A storage volume of over 3,000 cubic feet and typically closer to 4,000 cubic feet per car is needed. Other disadvantages are inefficient use of parking slots due to careless parking, damage to parked cars by careless drivers and sufficient headroom at each parking level to accommodate the drivers. The headroom is at least 8 feet, although car height is only about 5 feet.

Recently, automatic multi-level garages have been developed. Therein, elevators are used to automatically park cars in and retrieve them from selected parking stalls. Such systems are primarily designed to reduce the needed space volume per car and thereby increase the number of cars accommodatable in a given structure. All of the known automated garages suffer from one or more significant disadvantages. In some systems, the number of parking stalls reachable from any elevator is fixed and quite small, thereby requiring a large number of elevators. Also, the breakdown of any elevator prevents the retrieval of any car parked in stalls associated with the broken-down elevator, which may prove economically disastrous. Another major disadvantage of some proposed systems is the need for a separate movable platform, generally referred to as a pallet, for each parked car. In the latter systems, a car to be parked is first placed on a pallet which is in turn mounted on an elevator-supported dolly. When reaching the desired parking level, the dolly moves the pallet on which the car is supported to the selected parking stall and leaves the pallet with the car in the stall. The car is retrieved by using the dolly to move the pallet from the parking stall back to the elevator and therethrough to a parking pit.

In all known automated multi-level garages the structures include many mechanically-complicated moving parts which greatly increase the initial capital investment which require continuous or at least frequent maintenance.

OBJECTS AND SUMMARY OF THE INVENTION

Accordingly, it is an object of the present invention to provide an improved garage system which minimizes many of the disadvantages of similar prior art systems.

Another object of the present invention is to provide a new multi-level garage in which the space volume per parkable car is minimized.

Another object is to provide a new multi-level garage with a minimum of maintenance-requiring parts within the fixed structure.

Yet another object of the present invention is to provide a multi-level garage in which cars are parked directly in stalls which are an integral part of the fixed structure, without the need of a movable pallet per parked car.

Still a further object of the present invention is to provide a multi-level garage with an optimum number of stalls associated with each elevator for optimum car parking and retrieval time.

Still a further object of the present invention is to provide a multi-level garage with a plurality of service elevators with a minimum of maintenance-requiring parts and in which a car parked in any stall on any level is retrievable by any one of the elevators.

These and other objects of the invention are achieved by providing a multi-level garage in which on each parking level each elevator has associated therewith four parking stalls on the four sides of the elevator well. Each elevator and the four stalls associated therewith can be thought of as forming a cruciform module, with the entire garage structure consisting primarily of a plurality of interleaved modules. On each parking level, a fixed matrix of rails is provided which forms an integral part of the structure. Associated with each elevator is a movable transfer cart which supports at its top a transfer plate with four multifinger combs and its four ends. A car to be parked is driven onto the transfer plate, with each car wheel resting on the fingers of a different one of the four combs. Each parking stall consists of a stall unit which defines four spaced apart coplanar multifinger combs and, which are permanently fixed and form an integral part of the structure. A car is parked by first raising the elevator to the appropriate parking level. Then the transfer plate is raised vertically with respect to the transfer cart so that the combs of the transfer plate on which the cart rests are in a horizontal plane above the horizontal plane of the combs of the stall where the car is to be parked. Thereafter, the transfer cart is moved along the rails of the particular parking level to the selected stall. When the transfer cart is at the stall, the fingers of the combs on which the car rest are above the fingers of the combs of the stall unit. The transfer plate is then lowered so that the fingers of the combs of the transfer plate pass through the fingers of the combs of the stall unit and move below them. As a result, the cart is transferred from the fingers of the combs of the transfer plate, with its wheels coming to rest on the fingers of the combs of the stall unit, with each wheel resting on the fingers of one of the stall combs. Then the transfer cart is returned along the rails to the elevator for subsequent operation. The retrieval of the car is achieved by reversing the aforedescribed steps. Most importantly, herein, due to the matrix of the rails on each parking level, the transfer cart, associated with any elevator, can be used to reach any stall on any parking level.

DESCRIPTION OF THE PREFERRED EMBODIMENTS

Figure 1:
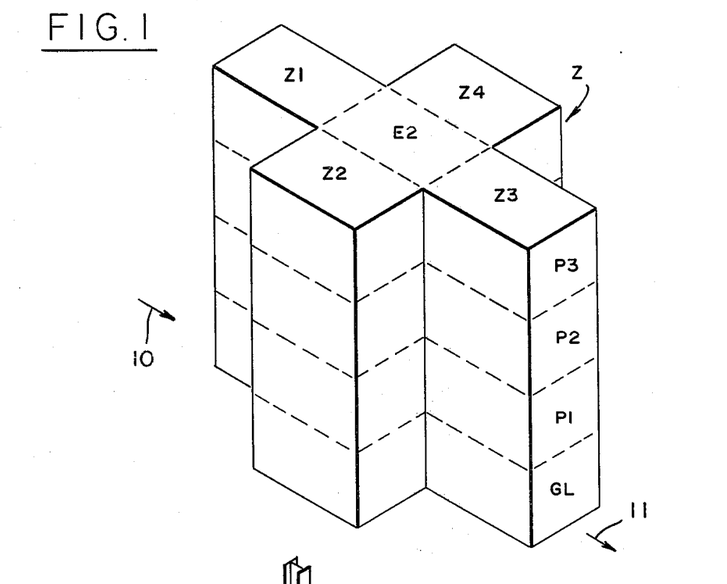
FIG. 1 is an isometric view of one module incorporated in the present invention.

The novel multi-level garage of the present invention is based on a modular design. One module is shown in FIG. 1 and is designated by Z. It is a multi-level unit in which an elevator designated $E_z$ is at the module center with four parking stalls on each parking level located at the four sides of the elevator. In FIG. 1, only three parking levels are shown and are designated as P1–P3. The ground level is designated as GL and is assumed to be used for car entry and exit into and from the elevator as represented by arrows 10 and 11. The elevator and each parking stall are rectangularly shaped. On each parking level, the two stalls at the elevator's opposite ends along the longitudinal axis are designated Z1 and Z3 and the two stalls as its opposite sides along its transverse axis are designated Z2 and Z4. Briefly, under normal failureless conditions, the elevator is used to park a car in any of the stalls associated therewith or retrieve a car therefrom. Since the module is somewhat cross-shaped, it may be referred to as a cruciform module.

Figure 2:
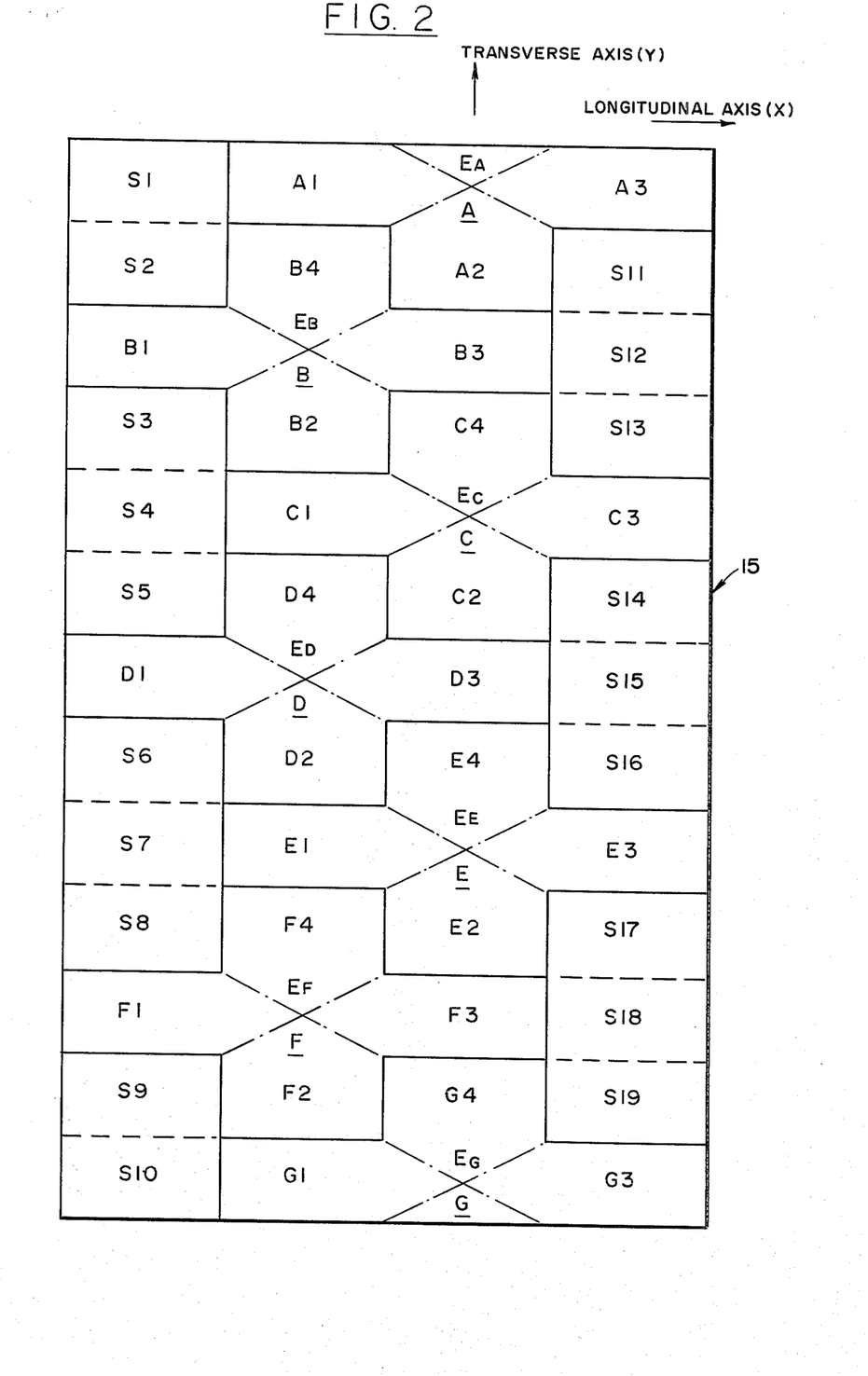
FIGS. 2 and 3 are plan views of a parking level in accordance with the invention.

In practice, a plurality of such modules are interleaved to form a multi-level structure which is typically rectangularly shaped. FIG. 2 to which reference is now made is a plan view of a rectangularly shaped garage structure 15, which includes A through G modules. The elevator of each module is designated by the letter E and the module's designation as a subscript and the stalls of each module are designated by the module's designation followed by a numeral from 1 to 4. As arranged in FIG. 2, module A has only three stalls, A1–A3 associated therewith while module G has also only three stalls G1, G3 and G4. Each of the other five modules B–F has four stalls. As arranged, any one of 26 stalls is directly accessible from one of the elevators. These stalls can be thought of as primary stalls since they are adjacent to one of the elevators and directly accessible therefrom. Each parking level also includes nineteen secondary parking stalls, designated S1–S19 along two sides of structure 15. As will be pointed out hereinafter, each of these secondary stalls is also accessible to enable a car to be parked therein.

Before proceeding to describe the invention in detail, it should be stressed that except for the vertically up-down moving elevators and transfer carts, which are associated with the elevators, one per elevator, and which moves horizontally on fixed rails on each parking level, the structure does not include any moving parts. Thus, once constructed, the structure requires a minimum of maintenance and is practically failure proof.

As seen from FIG. 2, the longitudinal axes of all the elevators and the parking stalls lie along parallel axes, hereinafter referred to as the longitudinal or X axes, which in FIG. 2 are horizontal lines, and the transverse axes are similarly parallel being referred to as the transverse or Y axes, which in FIG. 2 are vertical lines.

Figure 3:
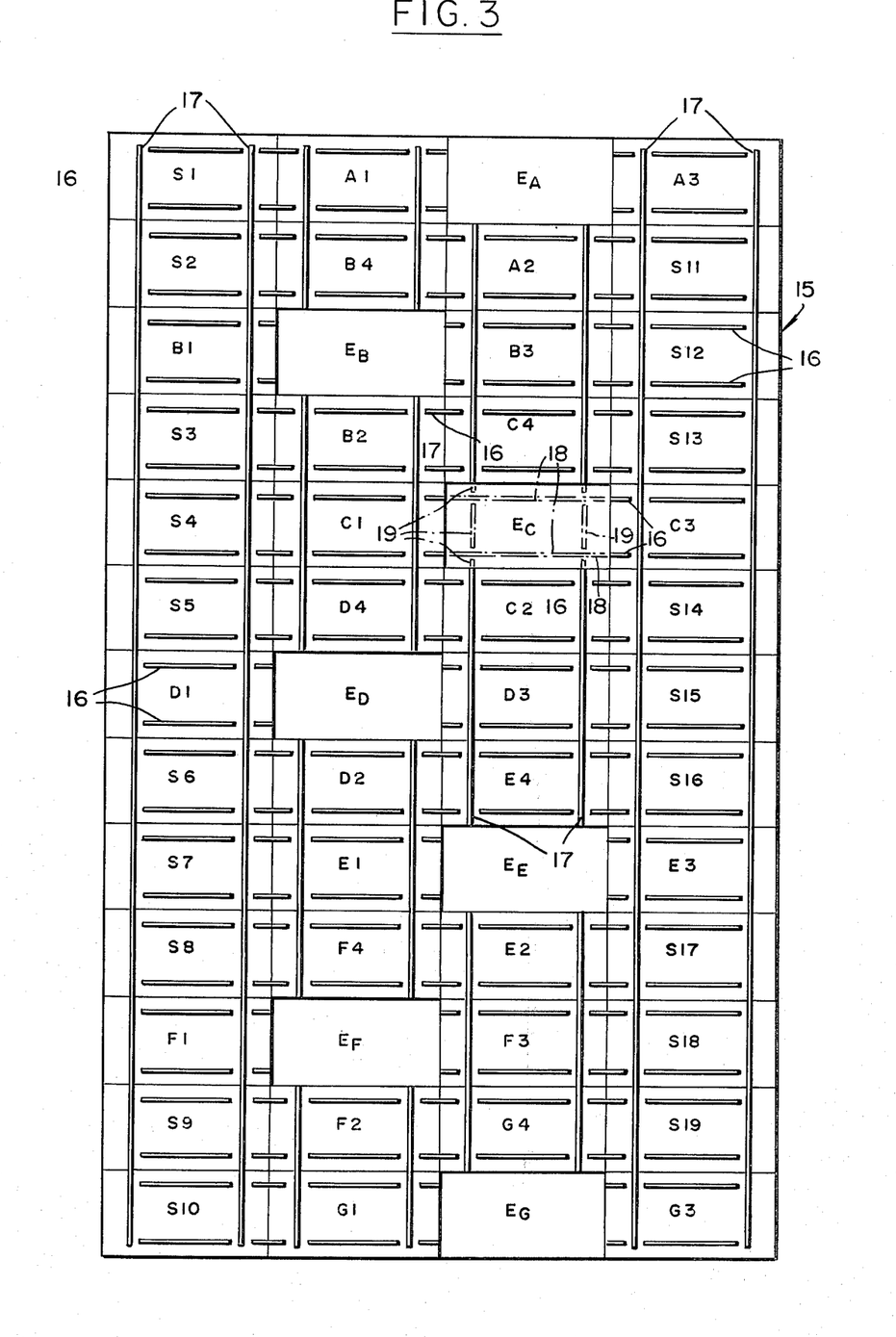

As seen from FIG. 3 at each parking level the structure 15 includes a grid of permanently fixed rails, along the X and Y axes, which criss-cross the entire level except at the elevator wells, so that a pair of spaced apart rails along the X axis, hereinafter referred to as the longitudinal rails, and a pair of spaced apart rails along the Y axis, hereinafter referred to as the transverse rails, criss-cross each and every parking stall, including the secondary stalls. The longitudinal and transverse rails are designated by numerals 16 and 17, respectively. Each elevator supports a top plate on which a rail grid, consisting of two longitudinal rails and two transverse rails is permanently fixed so that when the elevator is at a particular parking level, its rails join the fixed rails of the level to form a continuous rail grid therewith. In FIG. 3, only the rails of elevator $E_c$ are shown by dashed lines with the longitudinal and transverse rails of the elevator being designated by numerals 18 and 19, respectively.

Figure 4:
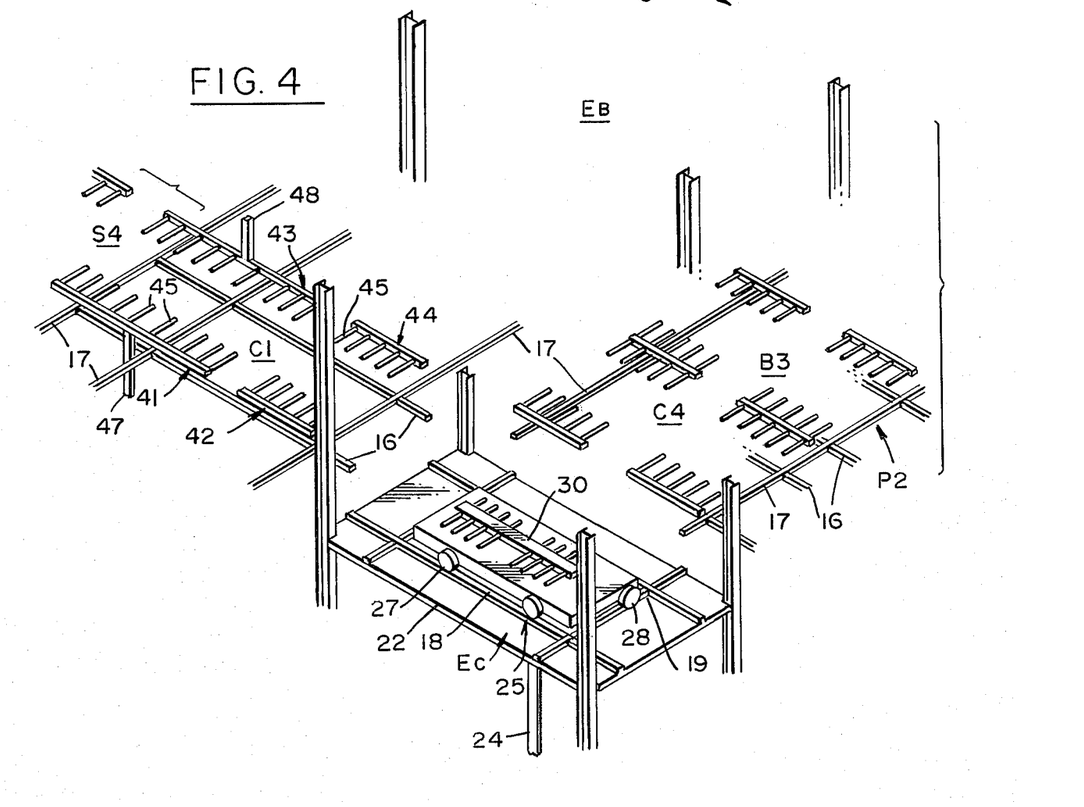
FIG. 4 is a partial isometric view of one of the parking levels.
Figure 5:
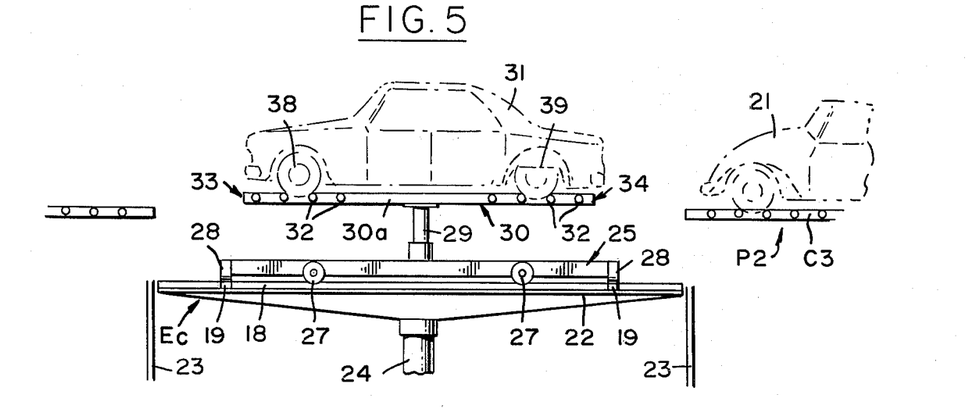
FIG. 5 is a side view of an elevator with its transfer cart on which a car is supported.

Attention is now directed to FIGS. 4 and 5. FIG. 4 is an isometric partial view showing elevator $E_c$ and stalls C1, S4, C4 and B3 of a parking level, e.g., P2. The elevator $E_c$ is shown below P2 and is assumed to move up toward P2. FIG. 5 is a side view of the elevator below P2. In FIG. 5, a car 21 is assumed to be parked in stall C3. As designated in FIG. 5, the elevator $E_c$ consists of a top plate 22 which is raised or lowered in elevator well 23 by a conventional elevator mechanism, generally represented by shaft 24. The rails 18 and 19, hereinbefore discussed, are fixedly attached to plate 22. Supported on these rails by means of eight wheels is a movable transfer cart 25. It is cart 25 which is used to transfer a car between the elevator and any parking stall by being moved along the rails hereinbefore discussed. The eight wheels include four longitudinal wheels 27 which support the cart on the two longitudinal rails 18, two wheels 27 per rail, while the other four wheels represent transverse wheels 28 which support the cart on the two transverse rails 19, two transverse wheels on each transverse rail 19.

Figure 6:
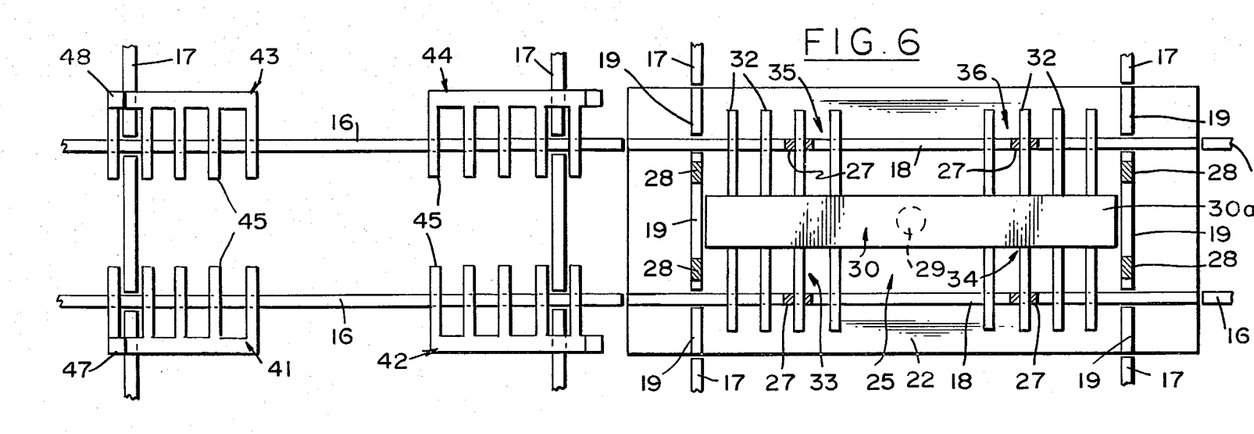
FIG. 6 is a top view of the transfer cart and the structure of a typical parking stall.

Supported above the cart 25 by means of a mechanism 29 is a transfer plate 30 on which a car 31 to be parked rests. A top view of the cart 25 with the plate 30 (without car 31) is shown in FIG. 6. The cart 25 is shown resting by means of the eight wheels on rails 18 and 19 on the elevator top plate 22. The transfer plate 30 is shown comprising a rectangular member 30a extending along the length of the cart 25. Extending outwardly from member 30a near its ends from either of its long sides are a plurality of arms or fingers 32. They are arranged in four sets 33–36, each set including a plurality of spaced-apart parallel fingers 32. All the fingers are parallel to one another coplanar and extend in the transverse axis. The transfer plate 30 can be thought of as a plate with four outwardly directed multifinger sets or combs, two combs positioned at one side of the plate and two at the other side. In operation, the fingers 32 of each comb are used to support one of the wheels of a car supported on the plate 30. In FIG. 5, the fingers 32 of combs 33 and 34 are shown supporting the left front and rear wheels 38 and 39 of car 31.

Attention is now directed again to FIG. 4 in connection with which the structure of each parking stall will be described. Since all the stalls are structurally identical only stall C1 will be described in detail. It is also shown in FIG. 6. Above the rails 16 and 17 which crisscross stall C1, the stall consists of four separate spaced-apart combs at the corners of the stall. The four combs are designated by numerals 41–44. Each includes a plurality of parallel spaced apart fingers 45. All the fingers point inwardly toward the stall space with all the fingers being coplanar in a horizontal plane. The function of the fingers of each comb is to support one wheel of a car parked in the stall. The combs 42 and 44 may be supported by the vertical posts forming the well of elevator $E_C$ while combs 41 and 43 may be supported by vertically extending posts 47 and 48, which form part of the structure 15. The four combs 41–44 can be thought of as cantilever coplanar horizontal multifinger combs which together form the stall.

The parking of car 31 (FIG. 5) in stall C1 of P2 will now be described. First the cart 25 is driven onto plate 30 at the ground level GL so that its wheels rest on combs 33–36 of plate 30. Then elevator $E_C$ rises to parking level P2. When reaching this level, the rails 18 and 19 of the elevator are aligned with rails 16 and 17 respectively of P2. The mechanism 29 is activated by a motor (not shown) or other mechanism in the transfer cart 25 to raise plate 30 above the cart 25 to a level or plane which is above the horizontal plane in which the fingers 45 of all the combs of the stalls at P2 are located.

Figure 7A:
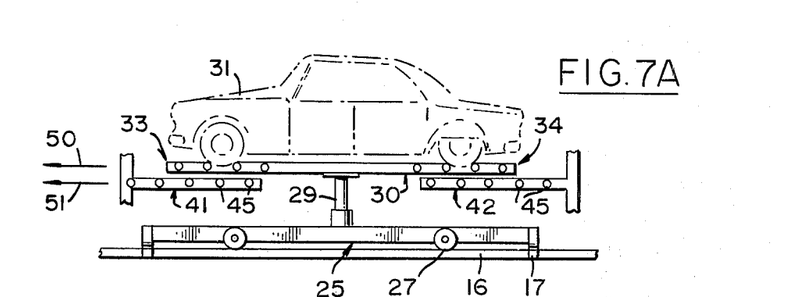
FIGS. 7A and 7B are side views useful in explaining the manner of parking a car in a stall.

To park car 31 from elevator $E_C$ in stall C1, the transfer cart 25 has to be moved in the longitudinal or X axis along rails 16 to the left. To facilitate such motion, the transverse wheels 28 which rest on rails 19 of the elevator have to be separated from the rails. This is achieved by mechanically or electromechanically raising these wheels. Consequently, the cart 25 now rests only on rails 18 by means of longitudinal wheels 27. The cart 25 is assumed to include a power source. It powers the wheels so as to roll the cart 25 with the cart 31 thereon to the left on rails 18. Since these rails are aligned with rails 16 of stall C1, the cart continues to roll to the left toward C1. Also, since the transfer plate 30 is above the plane of the combs of stall C1, it and the car 31 thereon move above these combs. The transfer cart 25 is rolled to the left until it is centered in stall C1, as shown in FIG. 7A. In this position, combs 33–36 on which the wheels of car 31 rest, are at a horizontal plane, designated by 50 which is above the plane of combs 41–44 of stall C1, designated by 51. In FIG. 7A, only comb 33 above comb 41, and comb 34 above comb 42 are shown.

Figure 7B:
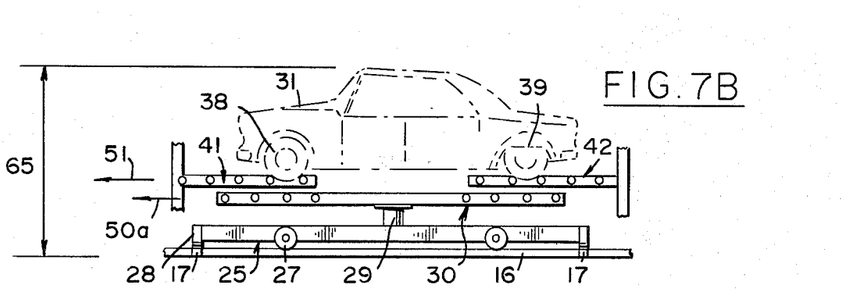

Once so positioned, the mechanism 29 lowers the transfer plate 30 toward the transfer cart. As the plate 30 is lowered, the fingers 32 of the combs 33–36 of the transfer plate 30 intermesh with the fingers 45 of the combs 41–44 of stall C1. As the plate continues to be lowered, so that now the plate 30 is below plane 51 as represented by 50a, the wheels of the car 31 rest on the fingers 45 of the combs 41–44 of the parking stall C1. This position is shown in FIG. 7B. Thus, the car 31 is transferred from the transfer cart 25 and is parked in stall C1. Thereafter, the cart 25 is rolled back to the elevator $E_C$ along rails 16 until it rests on rails 18 of the elevator.

At this point, the transverse wheels previously raised may be lowered onto rails 19 so that the cart rests again on all eight wheels. The elevator is then lowered to receive another car to be parked. To park car 31 in stall C4 instead of C1, the procedure is nearly identical except that instead of raising the transverse wheels 28, longitudinal wheels 27 are raised and thereafter the cart is rolled by the transverse wheels 28 along rails 19 and 17 to stall C4.

The procedure of retrieving a parked car from any stall is very similar, except that the transfer cart 25 is first rolled and centered at the appropriate stall with the transfer plate 30 at the lower position. Then the mechanism 29 is activated to raise the plate 30 above the horizontal plane 51 of the combs of the stall. Consequently, as the plate rises above this plane, the car is transferred from the stall combs to the transfer plate combs. The cart is returned to the elevator with the transfer plate 30 in the raised position to clear all the stall combs or fingers.

Figure 7C:
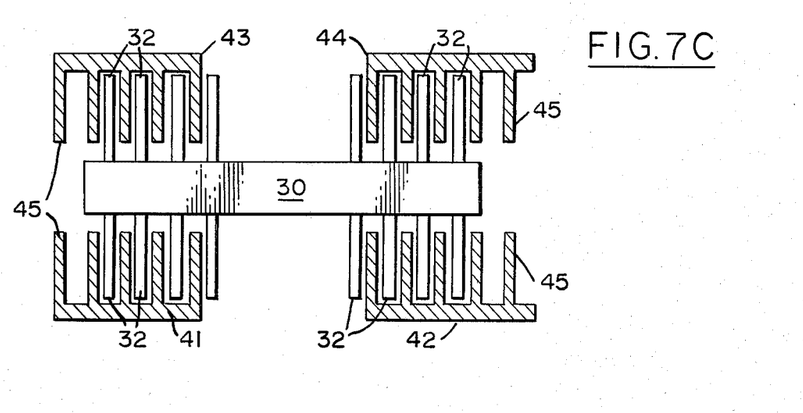
FIG. 7C is a top view showing the intermeshing of fingers of a stall with those of a transfer plate.

The free intermeshing of the fingers 32 of the transfer plate 30 with the fingers 45 of a parking stall is diagrammed in FIG. 7C, wherein the cart 25 is assumed to be centered at a parking stall such as C1. The fingers 45 of the stall and the fingers 32 of the transfer plate 30 are arranged so that, when the cart 25 is centered at a stall, the transfer plate 30 is movable from the plane represented in FIG. 7A by 51 which is above the horizontal plane of all the stalls' fingers, represented by 51, to a lower position, represented by 50a in FIG. 7B, the fingers 32 and 45 intermesh freely, i.e., do not come in contact as shown in FIG. 7C. Defining the plane 50 as the first raised position of the transfer plate 30 and the plane 50a as the second lowered position of the transfer plate, it can be stated that the stall's fingers 45 freely intermesh (at plane 51) with the fingers 32 of the transfer plate 30 as the latter is moved between the first and second positions (50 and 50a).

The fingers 32 and 45 may be shaped as horizontal cylindrical rods of constant diameter or as square prisms. However, since they are used to provide only downward loading or support, they are preferably shaped to taper down in the vertical dimension toward their tips. It should be appreciated that the spacing between any two adjacent fingers should be small enough to insure that a wheel of any car is supportable by any two fingers, and does not fall through the space between them. To minimize car alignment problems, each comb should preferably consist of three or more fingers, although theoretically only two fingers per comb are needed to support a wheel thereon.

Studies indicate the adequacy of a parking stall of about 80 inches wide (along the transverse axis) and about 18 feet long to accommodate practically all automobiles or the like. The two combs to accommodate the front of the vehicle may be 4 feet long and the two combs to support the rear wheels may be 5 feet long, leaving a space of about 9 feet between combs in the longitudinal axis. The fingers 45 may all be about 2 feet long leaving a space of about 32 inches between them. Such space is sufficient to enable the transfer mechanism 29 to pass therethrough when the transfer plate is at the first raised position above plane 51. Clearly, these stall dimensions are presented as an example and are not intended to limit the invention thereto.

From the foregoing, it should be appreciated that the only moving parts of the system are the elevators and the moving transfer carts. The rest of the structure does not have, nor require, moving parts. Thus, once constructed, the structure requires very little maintenance if any and is not subject to any failure. The transfer carts are easily accessible since each rides on its associated elevator and can be periodically maintained when the elevator is at the ground level.

It should be apparent that various means may be employed to raise and lower the necessary wheels of the transfer cart as hereinbefore described, such as by means of motor-driven cams, clutches or other arrangements, well known to those familiar with the art. Similarly, the tranfer plate may be raised or lowered by any conventional means, such as, an electrically actuated screw jack or a piston powered by a pump or accumulator. Such means are simply represented by shaft 29. Also, the rolling of the cart 25 may be achieved by driving the appropriate wheels by means of a DC motor in the cart. The power may be supplied by an appropriate power source, e.g., a battery in the cart. The direction of motion of the cart may be controlled by reversing the connections between the battery and the motor. This may clearly be achieved by controlling a relay by means of a remote control signal.

From the foregoing, it should thus be appreciated that each elevator can directly service the four stalls on its four sides, which together form the cruciform module by means of the movable transfer cart. Servicing the longitudinal stalls such as C1 and C3 is achieved by moving the cart of elevator $E_C$ along the longitudinal rails 16 on the longitudinal wheels 27, while the transverse wheels 28 are raised. Similarly, servicing of the transverse stalls C2 and C4 is achieved by moving the cart of elevator $E_C$ along the transverse rails 17 on the transverse wheels 28, while wheels 27 are raised. Parking a car in a stall is achieved by moving the cart 25 to the stall with transfer plate 30, on which the car rests, in its upper portion above the horizontal plane of the stall combs, represented by 51 in FIG. 7A. Then when the cart is centered in the stall, the transfer plate 30 is lowered to below plane 51, so that the car's wheels rest on the fingers 45 of the four combs of the stall. Retrieving a car from a stall is achieved by moving the cart 25 from the elevator to the stall with the transfer plate 30 in the lowered position. Then when centered at the stall the plate is raised above plane 51 to plane 50, as shown in FIG. 7A. Then the cart is returned to the elevator with plate 30 in the raised position to clear all the combs of the stalls.

The ability of any elevator to park or retrieve a car is not limited to the four stalls adjacent thereto. Due to the extension of the rails 16 and 17 through the entire parking level (except for the elevator wells), any elevator can by means of its transfer cart, park (and retrieve) a car in any other stall. For example (see FIG. 4), a car can be parked by elevator $E_C$ in stall S4 by merely moving the transfer cart 30 along rails 16 to S4 through C1. Clearly to accomplish this, stall C1 has to be vacant. In case a car is parked therein, it can be transferred to a vacant stall. Then after parking a car in S4, the previously parked car in C1 may be returned to C1.

This capability greatly increases the parking capacity of the structure since all the stalls, including the secondary stalls S1 and S19, can be used. It should be appreciated that the time of parking and retrieving cars from the secondary stalls, i.e., those not adjacent to the elevators is somewhat greater than that for cars in the stalls in the cruciform modules.

The presence of the matrix of rails 16 and 17 throughout the entire level is useful for an additional and very important reason. It enables any car on any parking level to be retrieved even under near complete elevator failure conditions. As long as one elevator is operable any car can be retrieved. Assume for example that due to unexpected power failure only elevator $E_G$ is operable (see FIG. 3). A car in stall A1 can be retrieved by moving the cart 25 of $E_G$ longitudinally through G1 to S10. Thereafter, the cart is moved transversely through the entire structure length to stall S1. Then, it is moved longitudinally to A1 to retrieve the car therefrom. Then the cart is returned to $E_G$ by retracking the path. It is clear that to accomplish such retrieval, stalls G1, S10, S9, F1, S8, S7, S6, D1, S5, S4, S3, B1, S2, and S1, must be vacant or first vacated. Thus, retrieval of a car from any stall is possible as long as one elevator is operative.

This capability is most significant since it prevents a disastrous condition in which parked cars cannot be retrieved due to system failure. Such failure is quite common in existing systems and it is believed that it is one of the reasons for their very limited use. It should be stressed again that in the system of the present invention, except for the elevators and their associated moving carts, the structure does not include any moving parts which are subject to frequent failure and mostly maintenance. Also, in the present system, each car is parked directly on the fixed combs of one of the stalls and not on any movable pallet. Thus, the present system eliminates the need of a pallet per parked car. For a system of a large storage capacity, e.g., 1,000 cars, 1,000 pallets are needed. Their initial cost is very great. Furthermore, storage must be provided for them and since they include many moving parts, they require frequent maintenance. Thus, their elimination by the present invention represents a significant advance of the art.

Figures 8, 9:
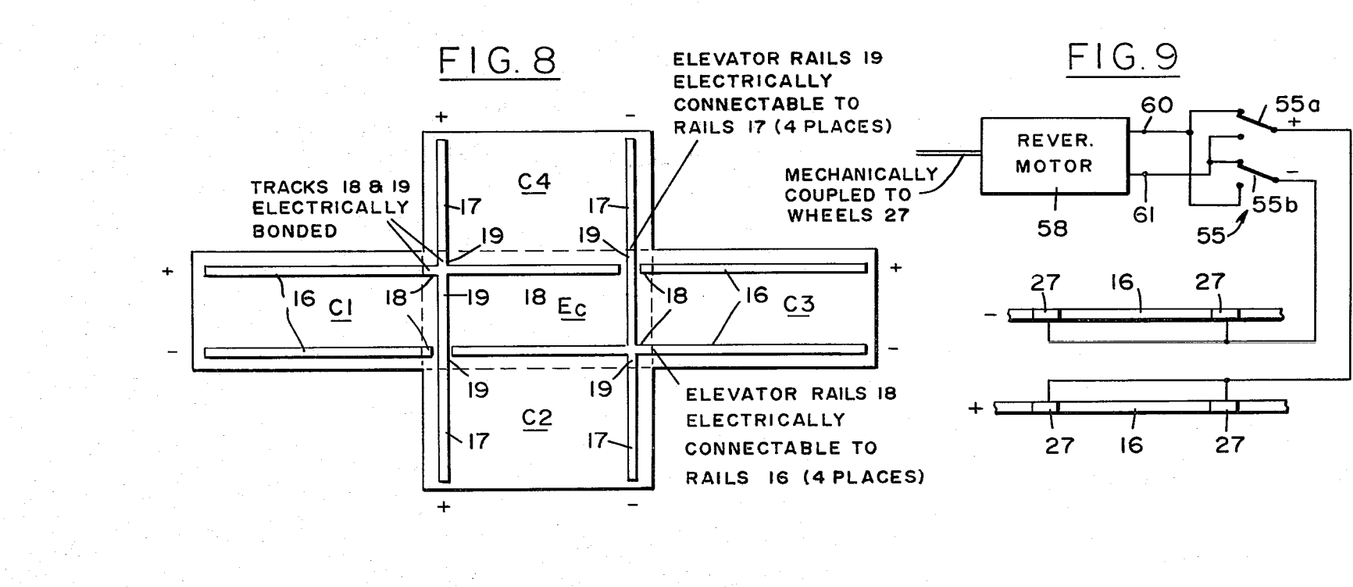
FIG. 8 is a diagram of a rail grid through one module useful in explaining the use of rails on power fuses.
FIG. 9 is a simple diagram useful in explaining the supply of power to the transfer cart through the rails.

Hereinbefore, it was assumed that rails 16 and 17 are passive and that the power to move the cart 25 of any elevator by means of the cart's wheels is provided in cart 25. If desired, the rails in addition to serving as tracks for the wheels, may be used as power buses to supply the power to the drive unit in cart 25 to turn the wheels. A simplified arrangement of the rail layout for one module such as module C is shown in FIG. 8. Therein, one rail 16 through C1 and C3 is assumed to be connected to the plus (+) terminal of a power source and the other rail 16 to the minus (−) terminal. Similarly, one transverse rail 17 such as the left rail is connected to the plus (+) terminal and the other to the minus (−) terminal. When the rails of the elevator are aligned with the parking level, rails 16 and 17, a complete rail grid is formed across module C. In such an arrangement, the power is supplied to the wheel driving unit in the cart 25 through the wheels which are in contact with the powered rails. Movement in opposite directions on each ordinate (longitudinal or transverse) is provided by including a reversible motor in the cart 25 and means, such as remotely controlled relay, which would control the polarity of the voltage applied to the reversible motor.

A simplified diagram for rails 16 is shown in FIG. 9 wherein the remotely controlled relay is shown as a DPDT switch designated by numeral 55. The reversible motor is designated by numeral 58 and its two terminals by 60 and 61. In the position shown, the plus voltage is supplied to terminal 60 from the plus rail 16 to wheels 27 and therefrom through switch 55a. The minus voltage is supplied to terminal 61 from the minus rail 16 through wheels 27 and 55b. By switching the relay to the second position, the voltage polarity to the motor is reversed and therefore its direction of roation is reversed. The motor is coupled to the longitudinal wheels 27 thereby controlling their direction of rotation which controls the direction of motion of the cart 25 in the longitudinal or X axis. A similar arrangement is assumed to be provided for motion control in the transverse of Y axis. It should be apparent that this grid pattern can be extended throughout the entire parking level, so that all the rails 16 and 17 can serve as power buses.

From the foregoing, it is thus seen that the present invention comprises a novel multi-level garage with a minimum of moving parts and one which is failure proof as long as one of its elevators is operative. All the moving parts, namely the elevators and the moving carts, are avaiable at the ground level for periodic maintenance. Except for those moving parts, the structure is practically maintenance free. Since any stall on each parking level is accessible by any elevator, parking capacity is optimized. The headroom or height of each parking level is the height from the rails 16 and 17 to the top of a car on the transfer plate 30 in the raised position. This height is represented in FIG. 7A by arrow 65. This height can be held to be about 6 or 7 feet which is a significant reduction over existing systems. Thus, the storage volume per stall in accordance with the present invention is minimized. Studies indicate that with the present invention, the average stall volume can be about 1500 ft$^3$. In ramp garages, the average space per parking stall is closer to 4000 ft$^3$ and in other automated systems, it is of the order of 2500 ft$^3$. Thus, advantages of the invention in maximizing the number of cars parkable in a structure of limited voluome is obvious.

It should be apparent that the entire operation of the system may be controlled either manually or preferably by a central computer. Such control is all within the state of the present art and therefore will not be described in further detail. Briefly, the computer can keep tab of all available empty stalls, to indicate which elevators cars should be driven for parking. The ticket, received by the driver, will indicate the stall in which the car will be parked initially. Then upon returning the ticket, this information will be used to retrieve the proper car. For maximum operating efficiency cars may be moved from one stall to another and the computer can keep tab of such movement so that when a car, initially parked at a given stall, is to be retrieved, the computer has the information, namely the last location of the particular car, for proper retrieval.

Although particular embodiments of the invention have been described and illustrated herein, it is recognized that modifications and variations may readily occur to those skilled in the art. For example, hereinbefore the movement of the transfer cart was described in connection with rails on which the cart rides by means of its wheels. Any means other than rails can be used to guide the transfer cart 25 of any elevator to any stall on the parking level along either a longitudinal (X) axis or a transverse (Y axis). For example, sensors, such as photoelectrical sensors may be positioned in the structure along either end of each row and column of stalls which together with sensors at the two ends and two sides of the transfer cart can be used to guide the cart along either the longitudinal axis or the transverse axis. The cart instead of eight wheels can be supported by four caster-type wheels to enable cart motion along either of the orthogonal axes. Likewise, guide wires may be embedded along the longitudinal and transverse axes of all the stalls. Such wires can be used by a sensor in the cart to guide it along the wires to insure proper cart travel between the elevator to any stall. Other arrangements can clearly be apparent to those familiar with the art of guiding a movable device such as the cart along two orthogonal axes to any of the stalls. Also, hereinbefore the fingers of each stall are shown to be parallel along the stall's transverse axis. This is shown for explanatory purposes only. The only basic requirement is that the stalls' fingers 45 and fingers 32 of plate 30 be arranged to enable their free intermeshing when the transfer plate is moved between its first and second positions to enable the transfer plate to move freely through the horizontal plane 51 in which all the stalls' fingers 45 are aligned.

Consequently, it is intended that the claims be interpreted to cover all modifications and equivalents which may readily occur to those skilled in the art.

What is claimed is:

1. A multi-level garage for parking automobiles or the like comprising:
   a multi-level structure including a plurality of parking levels, each level defining a plurality of adjacent rectangularly shaped parking stalls, the length of each stall extending along a longitudinal axis and the width along a transverse axis with all the stalls' longitudinal axes being parallel to one another and their transverse axes being parallel to one another, each stall comprising four spaced apart units in the shape of multifinger combs with all the fingers of each stall being parallel to one another in a horizontal plane with fingers of opposite combs pointing toward one another with all the fingers of all the stalls at each parking level being in a common horizontal plane;
   a grid of stall rails extending along each parking level at a plane below the horizontal plane of said stalls' fingers, with at least one pair of spaced apart parallel rails extending below the combs of each stall;
   potential means for applying an electrical potential difference to the pair of spaced apart rails extending below the combs of each stall;
   a plurality of rectangular elevators each movable vertically between said parking levels in a well thereof, each elevator comprising a top plate and a set of first and second pairs of elevator rails thereon;
   said two pairs of elevator rails including a pair of spaced apart elevator rails which extend along the elevator longitudinal axis and defining elevator longitudinal rails and a pair of spaced apart elevator rails which extend along the elevator transverse axis, and which define elevator transverse rails, whereby when an elevator is at a parking level its longitudinal rails are aligned and in contact with rails which extend along the longitudinal axes of the two stalls at opposite ends of the elevator, and the elevator's transverse rails are aligned and in contact with rails extending across stalls on opposite sides of the elevator along the stalls' transverse axes with the elevator rails being at the potentials of the stall rails with which they are in contact only when the elevator is at one of said parking levels; and a movable transfer cart supported on the elevator's rails and including first energizable means in engagement with said rails and in electrical contact therewith and responsive to the potential difference between said rails for moving said cart between the elevator and any stall along the rails aligned with the elevator's rails, said transfer cart including a top horizontal transfer plate defining four multifinger combs at the ends thereof, the fingers of each comb being adapted to support a wheel of an automobile supportable on said cart, the fingers of the combs of the transfer plate being parallel to one another pointing outwardly and in a common horizontal plane, said cart further including second energizable means for raising said transfer plate to a first position above the horizontal plane of the stalls' fingers and for lowering said plate to a second position below the horizontal plane of the stalls' fingers, with said transfer cart being movable to any stall with the transfer plate in either of said positions, with the fingers of the transfer plate and each stall being aligned whereby when a transfer cart is at any stall the fingers of the transfer plate and those of the stall intermesh freely to enable the transfer plate to be moved between said first and second positions.

2. The arrangement as recited in claim 1 wherein said grid of stall rails extends substantially throughout the entire parking level except at the elevators' wells, with substantially each stall having associated therewith a first pair of spaced apart parallel longitudinal stall rails and a second pair of spaced apart parallel transverse stall rails extending along the stall's longitudinal and transverse axes respectively, whereby the transfer cart of any elevator is movable along said grid of stall rails to substantially any stall on the parking level, with said potential means applying said electrical potential difference to each pair of stall rails.

3. The arrangement as recited in claim 2 wherein the first means of each transfer cart associated with each elevator includes a set of four longitudinal wheels supporting the cart on the elevator's pair of longitudinal rails, one pair of longitudinal wheels on each of said longitudinal rails, said longitudinal wheels being in physical and electrical contact with said longitudinal rails whereby said potential difference is applied between the two pairs of said longitudinal wheels, a first reversible motor for rotating said longitudinal wheels, and first switch means coupled to said first motor and to said two pairs of longitudinal wheels for controlling the application of the potential difference between the two pairs of longitudinal wheels to said first motor and thereby control the direction of rotation of said longitudinal wheels and a set of four transverse wheels supporting said cart on the elevator's transverse rails, one pair of transverse wheels on each of said transverse rails, said transverse wheels being in physical and electrical contact with said transverse rails whereby said potential difference is applied between the two pairs of said transverse wheels, a second reversible motor for rotating said longitudinal wheels, and second switch means coupled to said second motor and to said two pairs of transverse wheels for controlling the application of the potential difference between the two pairs of transverse wheels to said second motor and thereby control the direction of rotation of said transverse wheels, with either set of wheels being raisable to disengage the wheels from the rails to facilitate the cart's motion along either the longitudinal axes of said stalls or along the transverse axes thereof.

4. The arrangement as recited in claim 3 wherein said first means of each cart includes means for controlling the cart's motion in either of two opposite directions along any of the longitudinal or transverse rails, to facilitate the motion of the cart of any elevator from its elevator's well to any stall on each parking level, and back to said elevator well.

5. The arrangement as recited in claim 1 wherein the combs of each stall and the fingers of each stall are spaced apart so that the transfer cart of any elevator is freely movable with its transfer plate in the first position along the transverse axis of any stall between the stall combs and is freely movable with its transfer plate in the first position along the longitudinal axis of any stall without contacting the tips of any of the stall's fingers.

* * * * *